United States Patent

Wier

[11] Patent Number: 5,879,027
[45] Date of Patent: Mar. 9, 1999

[54] BELT TENSIONER FOR A SEAT BELT

[75] Inventor: Franz Wier, Göggingen, Germany

[73] Assignee: TRW Occupant Restraint Systems GmbH, Alfdorf, Germany

[21] Appl. No.: 851,964

[22] Filed: May 6, 1997

[30] Foreign Application Priority Data

May 6, 1996 [DE] Germany ............ 296 08 213 U

[51] Int. Cl.[6] ............................... B60R 22/36
[52] U.S. Cl. ................. 280/806; 280/801.1; 297/480
[58] Field of Search ..................... 280/801.1, 806; 297/480

[56] References Cited

U.S. PATENT DOCUMENTS

| 4,260,178 | 4/1981 | Kluting ........................... 280/806 |
| 5,037,132 | 8/1991 | Borlinghaus et al. . |
| 5,338,065 | 8/1994 | Fohl . |
| 5,568,940 | 10/1996 | Lane, Jr. ......................... 280/806 |
| 5,607,185 | 3/1997 | Isaji et al. ....................... 280/806 |

FOREIGN PATENT DOCUMENTS

| 2104446 | 4/1972 | France . |
| 3829975 | 10/1989 | Germany . |
| 29607362 | 10/1996 | Germany . |
| 49-4743199 | 7/1974 | Japan . |
| 50-42523 | 4/1975 | Japan . |
| 672290 | 3/1994 | Japan . |

*Primary Examiner*—Eric D. Culbreth
*Attorney, Agent, or Firm*—Tarolli, Sundheim, Covell, Tummino & Szabo

[57] ABSTRACT

A belt tensioner for a seat belt includes a piston/cylinder unit. The tube of the unit has a wall which is flattened in the region of its fastening end to form a fastening flange. The fastening end is engagable by a fastener for attaching said belt tensioner to the vehicle or the vehicle seat.

3 Claims, 4 Drawing Sheets

BELT TENSIONER FOR A SEAT BELT

FIELD OF THE INVENTION

The invention relates to a belt tensioner for a seat belt.

BACKGROUND OF THE INVENTION

Hitherto it was usual for belt tensioners to be secured to a vehicle or vehicle seat by screw fasteners, a screw extending through a strap welded to the wall of a tube defining the cylinder. In addition to this, belt tensioners also exist in which an additional element secured to the tube, such as e.g. a cable deflector, is provided with flanges by means of which the belt tensioner can be secured to the vehicle or vehicle seat, the belt tensioner being securely located in at least one plane due to the flat flange. However, providing straps or flanges welded to a tube or to an additional element for securing the belt tensioner makes its manufacture more expensive.

BRIEF SUMMARY OF THE INVENTION

The invention provides a belt tensioner of simple configuration which necessitates no additional part such as a strap to be welded to the tube so that the belt tensioner is made up of a few single parts which makes its manufacture cost-effective. The belt tensioner according to the invention includes a piston/cylinder unit having a tube with a fastening end and a piston arranged therein. The tube has a wall which is flattened at its fastening end to form a fastening flange. The fastening end is adapted to be engagable by fastening means for attaching said belt tensioner to one of a vehicle and a vehicle seat. By this arrangement, additional parts to be attached to the wall of the tube are avoided without any strength problems arising since the material cross-section in the cylindrical region corresponds to that in the flattened portion of the tube.

Preferably wall sections of the tube are pressed flat to form said flattened portion.

In accordance with one embodiment, the tube is pressed flat in the region of its fastening end to form a two-layer, plate-shaped fastening flange. The belt tensioner can be secured to the vehicle or the vehicle seat through at least one opening at the fastening end, by the fastening means passing through this opening.

In a further advantageous aspect, it is provided for that the tube is curved at least partly transverse to its longitudinal direction. The tube can thus be better adapted to the space available in the vehicle, by the fastening end being arrested e.g. at positions on the vehicle or vehicle seat having difficult access and the belt buckle end being oriented to the optimum position of a belt buckle connected to the piston by bending the fastening end or additionally also the remaining tube.

DETAILED DESCRIPTION OF PREFERRED EMBODIMENTS

Figure 1:
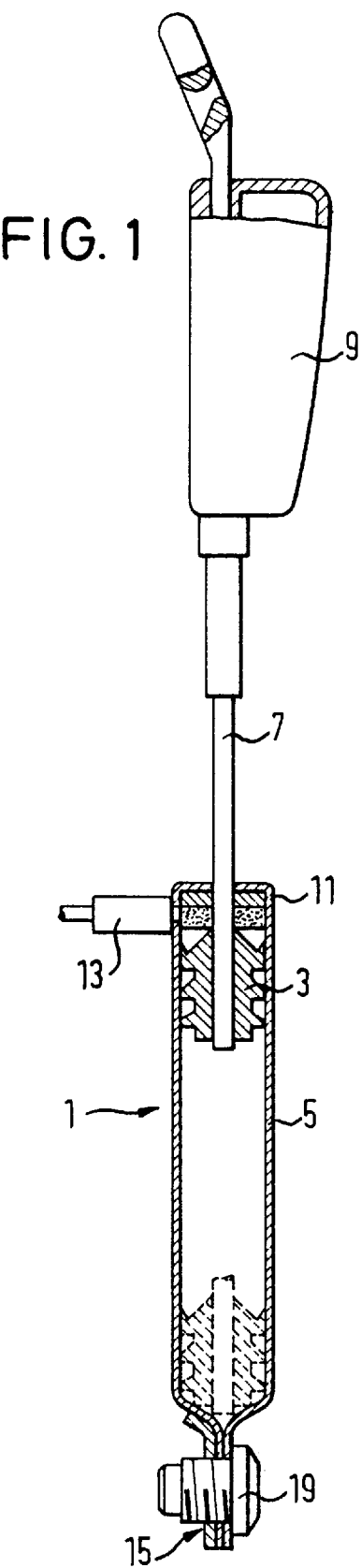
FIG. 1 is a longitudinal section view through a first embodiment of the belt tensioner according to the invention, having a belt buckle in contact therewith.

In FIG. 1 a belt tensioner 1 is shown which comprises a piston/cylinder unit consisting of a piston 3 and a tube 5. A pull cable 7 is secured to the piston 3 which connects the piston 3 to a belt buckle 9. A chamber accommodating a pyrotechnical propelling charge for actuating the piston 3 is provided at the belt buckle end 11 of the tube 5 within the tube, said pyrotechnical propelling charge being activatable by an igniter 13. The end of the tube 5 opposite the belt buckle end 11 is termed its fastening end 15.

Figure 2:
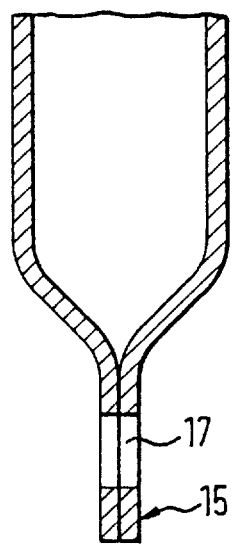
FIG. 2 is a magnified detail view of the fastening end of the tube shown in FIG. 1 as part of the belt tensioner.

The tube 5 is pressed flat at the fastening end 15 to form a two-layer, plate-shaped fastening flange, as is clearly evident from FIG. 2. Through an opening 17 in the fastening end 15 a screw 19 can be inserted, by means of which the belt tensioner 1 including the belt buckle 9 can be screwed to a vehicle or vehicle seat.

Figure 3:
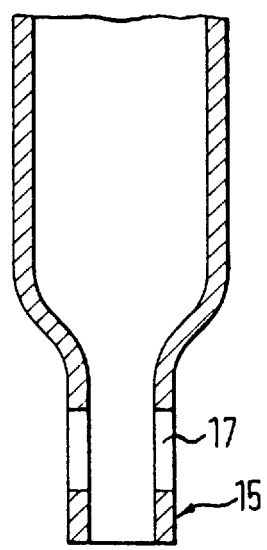
FIG. 3 is a longitudinal section view through the fastening end of the tube in accordance with a second embodiment.

The embodiment of the belt tensioner 1 shown in FIG. 3 differs from the embodiment shown in the FIGS. 1 and 2 by the wall sections of the tube 5 not being pressed together to form a two-layer, plate-shaped fastening flange, but instead only wall sections of the tube are pressed flat without the resulting parallel wall sections coming into contact with each other. The fastening end 15 may be closed at its end face or, as is shown in FIG. 3, may be open so that a kind of discharge orifice is formed. In the case of the embodiment shown in FIG. 3 too, the fastening end 15 features an opening 17 via which the belt tensioner 1 can be screwed e.g. to the frame of a vehicle seat.

Figure 4:
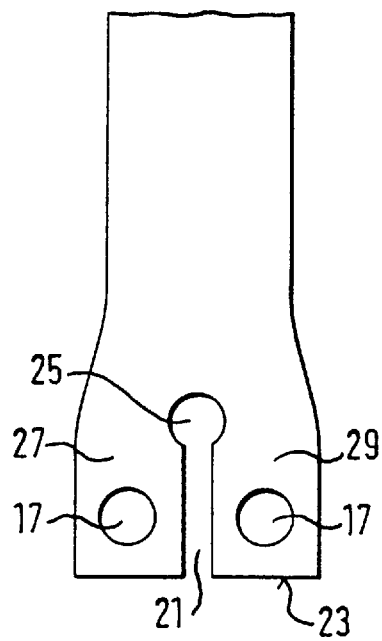
FIG. 4 is a side view of a fastening end provided with a longitudinal gap in accordance with a third embodiment.
Figure 5:
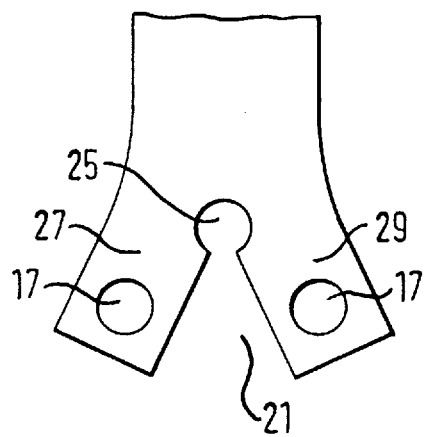
FIG. 5 shows a fastening end practically corresponding to the embodiment shown in FIG. 4 in which sections resulting from the longitudinal gap are laterally bent in opposite directions.

Whilst the belt tensioners 1 shown in the FIGS. 1 and 2 may be secured by means of a screw or a stud so as to be swivable on the vehicle or vehicle seat, the fastening end 15 of the embodiment of the belt tensioner 1 shown in FIGS. 4 and 5 features two openings 17. The fastening end 15 is in the case of these two embodiments provided with a longitudinal gap 21 extending from the end face 23 of the fastening end 15 and ending in a hole 25. The longitudinal gap 21 divides the fastening end into two sections 27 and 29, each of which has an opening 17, whereby the sections 27, 29 in the embodiment shown in FIG. 5 are bent in the plane of the flat portion so that the openings 17 are spaced away from each other more than in the case of the embodiment shown in FIG. 4.

Figure 6:
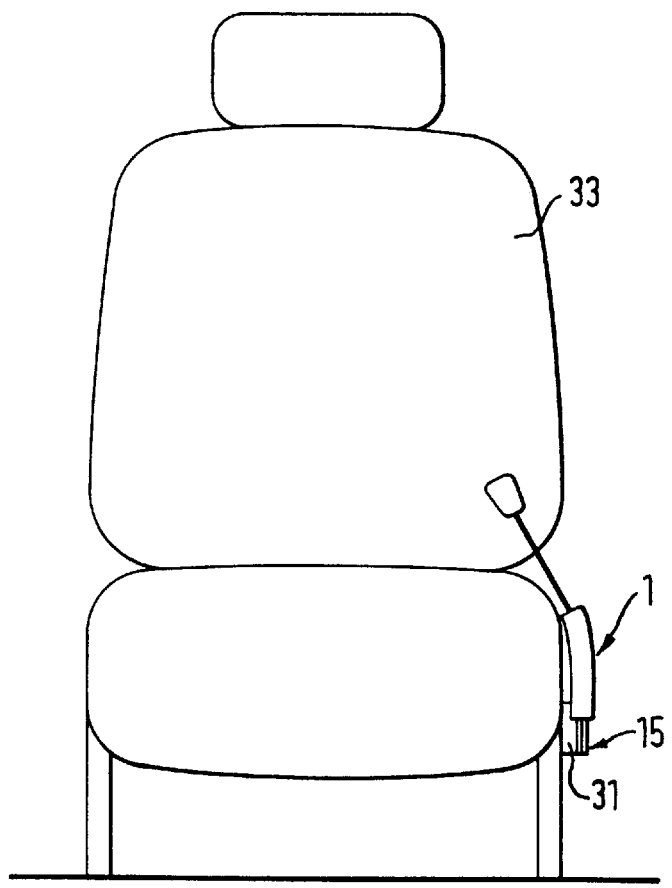
FIG. 6 is a front view of a vehicle seat featuring a belt tensioner in accordance with the invention, the tube of which is curved.

The belt tensioner 1 shown in FIG. 6 is swivably attached to a frame part 31 of a vehicle seat 33 connecting to a vehicle by means of a screw which extends through the opening 17 in the fastening end 15. To achieve a more or less linear introduction of the force from the seat belt into the belt buckle in case of restraint, the tube 5 is curved in its longitudinal direction so that the belt buckle 9 permits optimum placement, although the fastening end 15 is screwed to a location on the vehicle seat 33 which is difficult to access, i.e. a location which would have been unsuitable for securing a belt tensioner in the case of belt tensioners known hitherto always employing linear tubes. Depending on the arrangement of the belt tensioner 1 only one part of the tube 5 may be curved in the longitudinal direction, e.g. merely the fastening end 15 or the tubular, cylindrical section, or the tube 5 may be curved over its full length as shown in FIG. 6.

Since the wall of the tube or tube 5 translates integrally into the fastening end 15 an optimum introduction of the force to the fastening means materializes in case of restraint, thus eliminating additional single parts necessary hitherto in the manufacture of the belt tensioner such as fastener straps welded to the wall of the tube.

I claim:

1. A belt tensioner for a seat belt, including a piston/cylinder unit having a tube with a fastening end and a piston arranged therein, said piston engaging said tube, said tube having a wall which is flattened at its fastening end to form a fastening flange, said fastening end being adapted to be engagable by fastening means for attaching said belt tensioner to a vehicle, said fastening flange being formed by wall sections spaced from each other, said fastening end including at least one opening through which said fastening means extends when said belt tensioner is attached to the vehicle.

2. A belt tensioner for a seat belt, including a piston/cylinder unit having a tube with a fastening end and a piston arranged therein, said tube having a wall which is flattened at its fastening end to form a fastening flange, said fastening end being adapted to be engagable by fastening means for attaching said belt tensioner to a vehicle, said fastening end including a gap extending in a longitudinal direction of said tube and dividing the fastening end into two sections serving to secure the belt tensioner.

3. The belt tensioner as set forth in claim 2, wherein both sections are lying in a plane defined by the flat fastening end and are laterally bowed apart in said plane.

* * * * *